Figure 1:
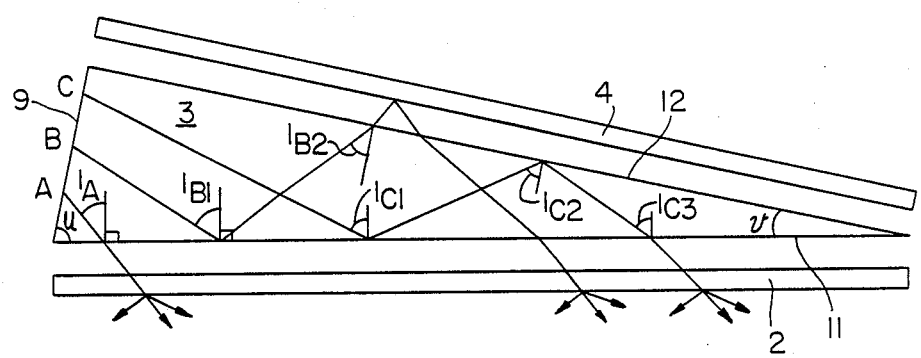

United States Patent [19]
Vinther

[11] Patent Number: 4,794,492
[45] Date of Patent: Dec. 27, 1988

[54] ILLUMINATED BOARD

[76] Inventor: Franz J. Vinther, 5 Lykkesholms Alle, DK-1902 Copenhagen, Denmark

[21] Appl. No.: 31,838

[22] Filed: Mar. 30, 1987

Related U.S. Application Data

[63] Continuation-in-part of Ser. No. 762,427, Aug. 5, 1985, abandoned.

[30] Foreign Application Priority Data

Aug. 7, 1984 [DK] Denmark ............................. 3800/84

[51] Int. Cl.⁴ .............................................. F21V 7/04
[52] U.S. Cl. ....................................... 362/31; 362/97; 362/812; 40/546
[58] Field of Search ...................... 362/31, 97, 812, 26, 362/27, 330, 224, 307, 311, 564; 40/546, 541, 577, 564

[56]   References Cited
U.S. PATENT DOCUMENTS

| | | |
|---|---|---|
| 2,646,637 | 7/1953 | Nierenberg et al. ................... 40/546 |
| 3,040,168 | 6/1962 | Stearns . |
| 3,464,133 | 9/1969 | Poray ..................................... 40/546 |
| 3,561,145 | 2/1971 | Shotwell . |
| 4,059,916 | 11/1977 | Tachihara et al. ..................... 362/31 |
| 4,277,817 | 7/1981 | Hehr . |
| 4,648,690 | 3/1987 | Ohe ..................................... 362/31 |

FOREIGN PATENT DOCUMENTS

| | | |
|---|---|---|
| 0167289 | of 1986 | European Pat. Off. . |
| 31104 | 11/1924 | France ................................... 362/31 |
| 456827 | 4/1950 | Italy ....................................... 362/31 |
| 1162560 | of 1969 | United Kingdom . |

*Primary Examiner*—Ira S. Lazarus
*Assistant Examiner*—D. M. Cox
*Attorney, Agent, or Firm*—Holman & Stern

[57]   ABSTRACT

The invention provides an illuminated board for use in sign boards, advertisement boards, drawing boards or similar planar objects to be illuminated comprising an elongate transparent and translucent wedge-shaped slab or prism with one essentially rectangular end face, two essentially triangular parallel side faces, one essentially rectangular smooth front surface and one essentially rectangular smooth rear surface, at least one light source arranged at said end face for illuminating said end face, one opalescent front panel arranged in a distance from said front face and essentially parallel to said front face and one reflective rear panel arranged in a distance from said rear face and essentially parallel to said rear face.

By arranging the panels and the wedge so that they are not in mutual contact an attractive uniform and bright illumination can be practically obtained even in sign boards in sizes up to 1.1 m by 1.5 m.

11 Claims, 1 Drawing Sheet

ILLUMINATED BOARD

This invention is a continuation-in-part of U.S. application Ser. No. 762,427, filed 8-5-1985, now abandoned.

This invention relates to an illuminated board for use in connection with advertisement boards and illuminated tables such as drawing boards.

Advertising boards with internal illumination have long been known. Usually such boards have been constructed with a transparent opalescent front panel, which may be painted or in other way provided with the desired image and a light source arranged behind the front panel. Generally, a uniform and bright illumination all over the front panel is desired in order that the entire surface area can be utilized for the image and in order that an attractive image may be seen. However, to provide such an illuminated board with a uniform illuminance and with an acceptable power economy has hitherto necessitated rather bulky constructions to allow a comparatively long distance from the light source to the surface of the board. As a great depth of design boards is for many applications not acceptable the practical solution has been to use a transparent front panel with strong light scattering capability or opacity, which invariably, however, means a reduced light transmittance, e.g. of the order 25 to 50 percent.

With the object to reduce the depth of such illuminated boards it is known to arrange the light source at the side of the surface and to utilize an oblique mirror in a size covering essentially the entire surface area and placed behind the front surface. If such a mirror is planar the light produced will not be uniform all over the front surface, but rather exhibit different intensities at different points all over the area of the front face, the intensity being proportional to the inverse square of the distance traversed by a light ray from the light source to the respective points. To overcome this, curved mirrors have been used, but these constructions are costly to manufacture and still necessitate a considerable depth of the advertisement board.

German Pat. No. 886,246 to Ringleb teaches an arrangement to illuminate a large colour slide utilizing a wedge shaped transparent slab to direct the light onto the slide. According to Ringleb a rectangular slab of glass in the form of a thick plate is machined on one side to produce a body in the shape of a triangular prism, i.e. a body with five faces, two of them, here designated the side faces, being triangular and mutually parallel, and three rectangular faces perpendicular to the side faces, said rectangular faces here designated the front face, the rear face, respectively the end face. A such body is commonly termed an optical wedge. The machined rear surface is mat or frosted. The plate is illuminated through the end face. A large colour slide is placed in contact with the unmachined front face and a cover glass is placed in contact with the other face of the slide. The frosted face is coated with amalgame so as to provide a reflector to reflect light back into the glass body. In an alternative embodiment Ringleb provides a separate mirror at the frosted side of the slab to reflect the light emanating from the back side back into the slab. The object of this device is to provide a bright illumination of the slide which should preferably be uniform over the entire slide surface area.

It is commonly presumed that this object will be achieved by an arrangement as the one described by Ringleb, the rationale being that light entering the end face of a slab with some index of refraction larger than that of the surrounding space will pass through the wedge being reflected internally at the front face and at the rear face several times to eventually emanate from the front face or from the rear face. At the first of these reflections the angle of incidence, i.e. the angle between the incoming ray striking the surface and the normal to this surface, will for light rays entering within a range of different directions be so large that the internal reflection is total.

According to common optical science the bordering angle g of total reflection inside a body with index of refraction n and surrounded by air will be $g$=arc sin $1/n$. Thus e.g. n=1.5 defines g=41.8° meaning that all light rays striking an inner surface in such a body with an angle of incidence larger than 41.8° will be reflected totally. As incidentally, the faces of the glass slab are not parallel, but rather arranged at a small angle, i.e. the wedge angle, the angle of light incidence is reduced upon each subsequent reflection with an amount equal to the wedge angle, whereby any ray of light after some number of reflections dependent upon the initial path and direction of that particular light ray will no longer be reflected internally, but will exit through a side face. Light emanating from the rear face is recovered by separate reflector means and redirected back into the wedge passing through the wedge with but a small angle of refraction to exit through the opposite side. Optical considerations based on the above outlined theory predict that, provided the light enters the wedge end face in a regularly distributed fashion, the light will also emanate from the side faces, respectively from the front face, in a corresponding regularly distributed fashion. It is to be particularly noted that the light intensity at the side faces of the wedge according to this theory is expected to be independent of the distance from the broad end face of the wedge.

Applicant has found that such arrangements do not perform as expected and in fact perform far from satisfactory, in particular for larger areas. The efficiency in terms of the illuminance produced appears to be low, but above all the illuminance is non-uniform showing a pronounced distance-dependent variation similar to what is obtained by a similar reflector without the wedge. Thus, it is evident that the wedge does not effect the light distribution in the manner predicted by the outlined theory. Such arrangements have hitherto been used to illuminate comparatively small objects such as instrument panels, where the wedge did not have to be very small and where neither power economy nor perfect uniformity has been critical. Advertisement boards based on this theory in larger sizes have hitherto never been used because of the poor illumination that could be produced. Another undesirable problem that was observed has been the appearance of so-called ghost images as the image placed in front of the wedge produced mirror images in the reflector behind the wedge that could be seen from the front side offset from the prime image. These mirror images could be blurred so much that they were no longer obtrusive by roughening one of the wedge faces or by coating a wedge face with some form of diffusive material. Such treatment, however, causes a further reduction in the produced illumination.

More recently one factor causing low efficiency has been identified, in that the major part of the light from such a device emanates from the wedge at rather oblique angles and therefore is of no use for observers viewing the front face from a point perpendicular to that front face. This factor, however, in no way explains the non-uniformity of the illuminance pattern seen. It is known to redirect the light exiting the wedge at oblique angles by some diffusive treatment of the wedge surface, but such treatment cannot remedy the two major problems, the low efficiency and the non-uniformity of the illuminance.

Applicant has discovered that the reason for the unexpected non-uniformity is that the regular pattern of reflections is destroyed if the smooth wedge surface is impaired in any way, be it by roughening, coating or contact with any other medium, whether transparent or not. At the point of any such surface impairment the regular reflection of light rays is destroyed and instead a diffuse scattering of light is produced. The result is a light distribution similar to what can be obtained with a mirror and without the wedge.

The object of the present invention is to design a board for the illumination of surfaces such as advertisement boards, traffic sign boards, illuminated tables such as drawing boards and shop signs with lower energy consumption and in a less bulky construction than is the case with the hitherto known systems.

The present invention provides an illuminated board for use in sign boards, advertisement boards, drawing boards or similar planar objects to be illuminated comprising an elongate transparent and translucent wedge-shaped slab or prism with one essentially rectangular end face, two essentially triangular parallel side faces, one essentially rectangular smooth front surface and one essentially rectangular smooth rear surface, at least one light source arranged at said end face for illuminating said end face, one opalescent front panel arranged in a distance from said front face and essentially parallel to said front face and one reflective rear panel arranged in a distance from said rear face and essentially parallel to said rear face.

By arranging the panels and the wedge so that they are not in mutual contact the uniform light distribution theoretically expected from a wedge can now be practically obtained.

By arranging a reflective rear panel the light emanating from the rear face of the wedge is fully recovered and redirected back into the wedge.

By colouring the rear panel the light reflected there is scattered so much that mirror images of objects placed in front of the wedge are not visible.

By arranging an opalescent front panel the light emanating from the front face in oblique angles is diffused or scattered so that the front surface appears brightly illuminated as seen from all directions.

Thus, the invention provides an illuminated board, which can be manufactured in large area sizes at small depth and yet can yield an attractive, even a brightly illuminated front face. Preferably fluorescent tubes are used as light sources as they can uniformly illuminate the entire broad face of the wedge. The light source or sources may advantageously be mounted at the top of the reflective back panel. The light source is preferably arranged inside a U-shaped profile to screen the light source from being directly visible. The electrical supply is preferably the public power supply.

An improved energy efficiency in comparison to existing systems is obtained because the wedge distributes the light so evenly that a front panel, for instance a white front panel, only needs a very slight opacity in order to look precisely as evenly lit as the front panel of existing systems which—in order to conceal the luminous tubes—needs a considerable opacity. Typically, according to the invention it will be possible to use front panels having a light transmittance of 75% compared to existing sign board systems which make use of front panels having a light transmittance of 25-50%.

Figure 2:
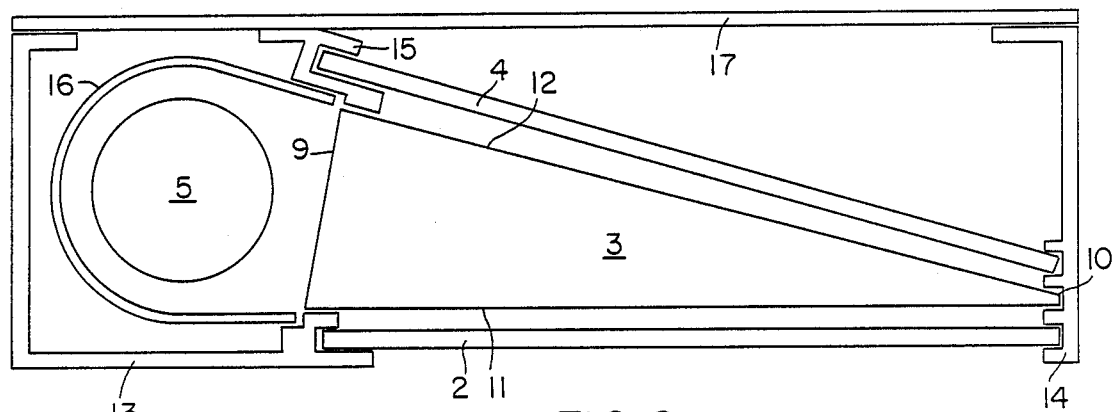
Figure 3:
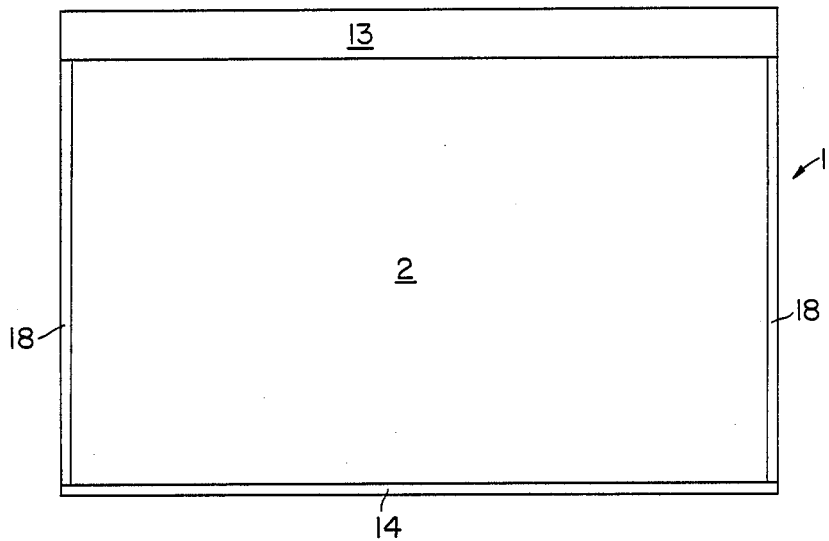

The invention will be more fully explained in the following, reference being made to the drawing in which FIG. 1 is a schematical diagram showing optical paths in a wedge, FIG. 2 is a cross section of the illuminated board according to the invention, and FIG. 3 is a front view of the illuminated board.

The schematical diagram in FIG. 1 shows the optical wedge designated 3 as a whole, a transparent front panel 2 and a reflective rear panel 4. The wedge 3 is a transparent body with two parallel triangular side faces (not shown) and three rectangular faces being the broad end face 9, the front face 11 and the rear face 12. The wedge is made of transparent material such as acryl with some index of refraction n, which must be larger than that of the surrounding air, thus n>1, e.g. n=1.5. The wedge is illuminated by some means not shown in FIG. 1 at the broad end face 9. The illumination should cover the entire broad end face with light rays which may be scattered in various directions.

The narrow wedge angle v between front face 11 and rear face 12 is in the range 1°-4°, whereas the figures for reasons of clarity show the wedge angles greatly exaggerated. The angle u between the broad end face 9 and the front face 11 is in the range 60°-90° C. and preferably about 83° C.

As explained above, the index of refraction n defines a limiting angle of reflection inside the wedge by the formula $g = \arcsin 1/n$, where g is the angle of incidence which is measured from the normal to the plane of incidence. FIG. 1 shows the paths traversed by three rays of light A, B, and C after entering the broad end face 9. Light ray A strikes the front face of the wedge 11 with an angle of incidence $I_A$. Assuming $I_A < g$ this light ray will cross the front face and exit from the wedge. A second ray of light B entering the wedge at an angle different from that of the ray A strikes the wedge front face 11 at an angle of incidence $I_{B1}$ larger than $I_A$ and assumed here to be larger than g. This ray is therefore reflected inside the wedge to strike subsequently the rear face 12. As incidentally the front face 11 and the rear face 12 of the wedge are situated at an angle v, the angle of light incidence $I_{B2}$ at the rear face will now be smaller than the angle of incidence at the front face $I_{B1}$ by the amount v, thus $I_{B2} = I_{B1} - v$. It is assumed that $I_{B2}$ is smaller than g, which is possible, provided $I_{B1}$ was just slightly larger than g. This light ray therefore exits from the wedge through the rear face to strike the rear panel 4. The reflective rear panel 4 reflects this light ray back into the wedge, and light ray B traverses the wedge to exit through the front face. A third ray of light C enters the wedge at an angle different from those of the rays A and B, striking the front face 11 at an angle of incidence $I_{C1}$ which is larger than $I_{B1}$. Light ray C is therefore reflected at the front face 11 to strike the rear face 12 with an angle of incidence $I_{C2}$. It is assumed that $I_{C2}$, which is equal to $I_{C1}$ less v, is still larger than g, and light ray C is therefore also reflected at the rear side 12 to strike the front face 11 a second time. The angle of incidence this time, $I_{C3}$, is equal to $I_{C2}$ less v, and assuming that $I_{C3}$ is less than g the light ray C will now exit through the front face 11.

From the above given explanation it is easily understood that the entire front face 11 in this way can be illuminated by illuminating only the end face 9 and that a uniform illumination of the end face 9 provides a corresponding uniform illumination of the front face 11. A more detailed study of this optical system reveals that a uniform illumination of the broad end face 9 will produce a perfectly uniform illumination of the front face 11 except for a smaller part to the left hand side in the FIG. 1 and that the optical system provided by the wedge effectively compensates for the different distances of various points on the front face 11 from a light source located at the broad end face 9 thus to provide an attractive uniform illumination of the front face 11. The only portion where the illumination is not uniform is a part of the wedge to the left hand side in FIGS. 1 and 2 where light rays may pass through the wedge broad end face and front face, such as the light ray A, without being reflected. A corresponding part of the wedge front face will therefore exhibit higher illumination intensities than the remaining part of the front face.

The light rays exiting through the front face 11 will exit at rather oblique angles. This is generally undesirable as observers for many practical applications of illuminated wedges will be viewing the wedge from a point generally in front of the wedge. It is therefore advantageous to provide a front panel, such as the transparent panel 2, which is diffusive so that light rays entering this panel will be spread to various directions. It is previously known to make the front face 11 diffusive, but applicant has discovered that this destroys the desired light distributing capabilities of the wedge. It is therefore advantageous to keep the front face of the wedge 11 clear and to arrange a diffusive transparent front panel 2 at a distance in front of the wedge.

FIG. 2 shows a cross section of an illuminated board as practically built. It is understood that the thickness of the board in this figure for reason of clarity is shown grossly exaggerated. This board comprises a wedge 3 similar to the one shown in FIG. 1 and with faces 9, 11, and 12 as explained in relation to FIG. 1. The wedge 3 is truncated at the tip to provide a narrow end face 10 with the object to facilitate structurally rigid mounting of the wedge's narrow end. The practical illuminated board further comprises a transparent front panel 2 and a reflective rear panel 4 similar to those shown in relation to FIG. 1. The advertising board comprises a light source 5, such as a fluorescent tube. Around the light source a U-shaped reflector 16 is arranged to direct all of the light emitted from the light source 5 into the broad end face 9 of the wedge. The various parts of the illuminated board are fitted in mounting profiles 13, 14, 15 fixed to an external rear panel 17. The various electrical components needed for the fluorescent tube, such as a coil and a starter, may be located inside the illuminated board in the empty space left between the reflective rear panel 4, mounting profile 14 and the external rear panel 17.

FIG. 3 shows a front view of the illuminated board of FIG. 2 designated 1 as a whole, showing profiles 13 and 14 and the transparent front panel 2. The board is completed by side panels 18, 18.

The image, characters or indicia to be displayed are arranged on the front panel 2 e.g. by painting, printing, engraving or adhering a transparent slide onto the panel 2. If a slide is used it must according to the invention be arranged so as not to contact the wedge front face 11.

With the arrangement shown the illumination of the end face 9 is in fact not perfectly uniform, giving rise to a non-uniform illumination of the front face apparent as several parallel images of the light source visible from the front. It has been discovered that by arranging the diffusive front panel 2 at a distance from the prism front face 11 in the range of 1 to 5 mm the illumination is spread sufficiently in order for the illuminated board to appear attractively uniformly lit.

If arranged with a polished reflector 4 and some indicia on the front panel 2, an illuminated board as shown in the FIG. 2 may in addition to the image desired produce undesired ghost images of the indicia on the panel 2, these indicia being reflected in the reflector 4 and displayed beside the indicia wanted. Applicant has discovered that such ghost images or mirror images may be removed or obscured by making the reflector 4 mat, semifrosted or frosted and by keeping a distance between this reflector 4 and the wedge rear side 12 in the order of 1 to 5 mm. By this arrangement the desired light distribution characteristics of the wedge 3 are not impaired.

As explained above the illumination produced at the front face 11 of the wedge will exhibit uniform intensity over the greater part of the front face 11, but will though show a higher intensity in a certain region near the light source wherein rays of light may pass through the faces 9 and 11 with no reflections. According to the invention the broad end face 9 is therefore arranged at an angle from the front face 11 in the order of 60° to 90° and preferably about 83°, and the profile 13 is extended to cover a part of the wedge front face 11. The width of the region of the wedge front face screened is preferably about half of the wedge thickness, such as in the range 10–20 mm. By arranging the broad end face 9 at an angle from the front face 11 less than 90 degrees the region on the wedge front face 11 with higher light intensity is concentrated to a narrower portion near the light source. By extending the profile 13 over part of the wedge front face this portion is obscured from view to make visible only that part of the illuminated board which is attractively uniformly lit.

By the measures explained it has now become possible to construct illuminated boards at limited depth, with an attractive appearance and a good power economy in sizes which have never before been practically and commercially feasible. Illuminated boards according to the invention have been manufactured at a total constructional depth of 60 mm in sizes as the following examples:

| | | | |
|---|---|---|---|
| Height of illuminated area on front panel | 40 cm | 50 cm | 110 cm |
| Width of illuminated area on front panel | 60 cm | 90 cm | 150 cm |
| Thickness of wedge | 2.5 cm | 2.5 cm | 3.0 cm |
| Wedge angle v (degrees) | 3.6° | 3.0° | 1.6° |

It will be appreciated that the embodiments explained are presented as non-limitating examples only and that numerous other embodiments and modifications of the invention will be apparent to those skilled in the art. E.g. the wedge may be manufactured from other transparent materials such as polycarbonate, glass or others and in other sizes and dimensions. The invention is therefore intended to be limited only by the scope of the appended claims.

What is claimed:

1. An illuminated board for use in sign boards, advertisement boards, drawing boards and like planar objects to be illuminated, comprising
an elongate, transparent and translucent wedge-shaped prismatic slab having one essentially rectangular end face, two essentially triangular parallel side faces, one essentially rectangular smooth front surface and one essentially rectangular smooth rear surface,
at least one light source arranged at said end face for illuminating said end face,
an opalescent front panel arranged adjacent said front face,
a reflective rear panel arranged adjacent said rear face, and
mounting means for holding said slab, said front panel and said rear panel so as to maintain said front panel parallel with and at a predetermined distance from said front face of said slab and, respectively, so as to maintain said rear panel parallel with and at a predetermined distance from said rear face of said slab.

2. An illuminated board according to claim 1, wherein said predetermined distance from said slab front face to said front panel is in the range of 1 to 5 mm.

3. An illuminated board according to claim 1, wherein said predetermined distance from said slab rear face to said rear panel is in the range of 1 to 5 mm.

4. An illuminated board according to claim 1, wherein said reflective rear panel is frosted.

5. An illuminated board according to claim 1, wherein said reflective rear panel is semifrosted.

6. An illuminated board according to claim 1, wherein each said light source is a fluorescent tube arranged parallel to the edge of the wedge.

7. An illuminated board according to claim 1, wherein the angle between said front face and said rear face is in the range from 1° to 4°.

8. An illuminated board according to claim 1, where the size of the wedge from the broad end face to the tip is in the range from 40 to 110 cm.

9. An illuminated board according to claim 1, wherein the angle between the front face and the broad end face is in the range from 60° to 90° and preferably about 83°.

10. An illuminated board according to claim 1, wherein a part of said mounting means adjacent said wedge end face extends over a portion of the wedge front face so as to screen said portion of the wedge front face.

11. An illuminated board according to claim 1, wherein said opalescent front panel exhibits a light transmittance of more than 50% and preferably about 75%.

* * * * *